(12) United States Patent
Jonsson et al.

(10) Patent No.: US 7,972,090 B2
(45) Date of Patent: Jul. 5, 2011

(54) INDEXABLE TURNING INSERT AND A CUTTING TOOL COMPRISING SUCH AN INSERT

(75) Inventors: Mats Jonsson, Hedemora (SE); Patrick Jonsson, Fagersta (SE); Kaj Virtanen, Fagersta (SE)

(73) Assignee: Seco Tools AB, Fagersta (SE)

( * ) Notice: Subject to any disclaimer, the term of this patent is extended or adjusted under 35 U.S.C. 154(b) by 557 days.

(21) Appl. No.: 12/211,392

(22) Filed: Sep. 16, 2008

(65) Prior Publication Data
US 2009/0162154 A1  Jun. 25, 2009

(30) Foreign Application Priority Data

Dec. 20, 2007 (SE) .................... 0702852-5

(51) Int. Cl.
*B23B 27/16* (2006.01)
*B26D 1/00* (2006.01)
(52) U.S. Cl. ........................ 407/103; 407/113
(58) Field of Classification Search .............. 407/113, 407/114, 117, 103, 35, 101
See application file for complete search history.

(56) References Cited

U.S. PATENT DOCUMENTS

| | | | | |
|---|---|---|---|---|
| 2,590,053 A | * | 3/1952 | Taylor | 175/383 |
| 4,632,608 A | * | 12/1986 | Blomberg et al. | 407/114 |
| 5,308,197 A | * | 5/1994 | Little | 407/101 |
| 6,527,485 B1 | * | 3/2003 | Little | 407/24 |
| 6,612,207 B2 | * | 9/2003 | Schiffers | 82/1.11 |
| 7,597,508 B2 | * | 10/2009 | Hecht | 407/101 |
| 2003/0156910 A1 | | 8/2003 | Friedman et al. | |
| 2007/0231089 A1 | * | 10/2007 | Hecht | 407/113 |

FOREIGN PATENT DOCUMENTS

DE  2510960 A1  9/1976
EP  1136158 A1  9/2001

OTHER PUBLICATIONS

International Search Report for corresponding International Application PCT/SE2008/050927, 2008.

* cited by examiner

*Primary Examiner* — Will Fridie, Jr.
(74) *Attorney, Agent, or Firm* — WRB-IP LLP

(57) ABSTRACT

An indexable turning insert includes two opposing larges sides formed by a support center part and a plurality of cutting parts projecting outwardly therefrom, each having a cutting edge extending between the sides and being spaced apart around the outer perimeter of the center part for indexing, has four the cutting parts. Each cutting part has a clearance side extending on one of the sides of the insert from the cutting edge of the cutting part towards the center part while making clearance angles in two dimensions with respect to the cutting edge, and the cutting edge of each cutting part makes an angle being below 90° by less than the clearance angles with the other of the sides of the insert.

23 Claims, 4 Drawing Sheets

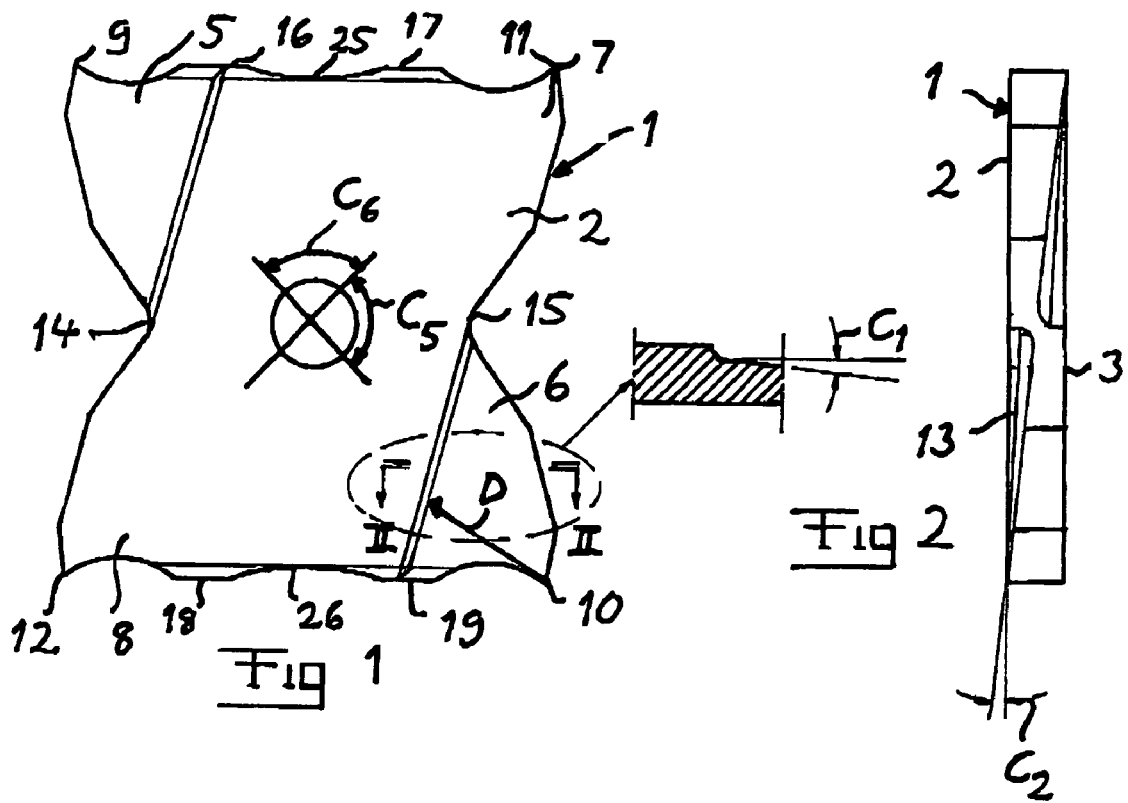
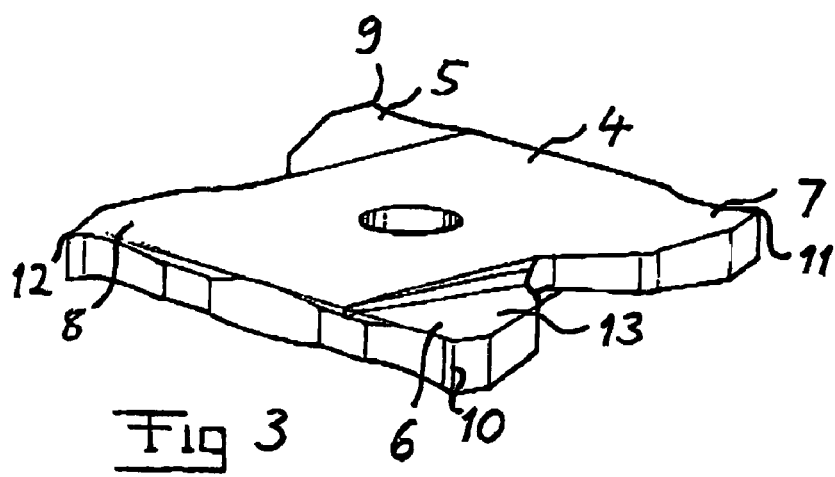

US 7,972,090 B2

INDEXABLE TURNING INSERT AND A CUTTING TOOL COMPRISING SUCH AN INSERT

BACKGROUND AND SUMMARY

The invention relates to an indexable turning insert comprising two opposing large sides formed by a support centre part and a plurality of cutting parts projecting outwardly therefrom, each having a cutting edge extending between the sides and being spaced apart around the outer perimeter of the centre part for indexing, as well as a cutting tool comprising an indexable turning insert and an insert holder.

The invention is generally directed to turning inserts for carrying out any type of turning machining upon a rotating work piece, and it is particularly directed to such turning inserts for non-longitudinal turning, such as parting-off, grooving and transverse turning.

When using such a turning insert one cutting edge thereof is utilized for the turning operation until it is worn out or otherwise fails, such as is broken, whereupon the insert is moved, and put in a new position in an insert holder, i.e. indexed, for utilizing another of the cutting edges of the insert.

It is from the cost point of view desired to have, as many cutting parts and by that cutting edges as possible on such a turning insert, but an increased number of such cutting edges results at the same time in a reduced maximum depth of grooves when using the turning insert for grooving.

WO 03/070403 A1 discloses an indexable turning insert of the type defined in the introduction, which has 5 cutting edges making it comparatively attractive from the cost point of view, but it may only be used for obtaining comparatively shallow grooves when grooving and not be used for transverse turning, since the support centre part will then hit the work piece.

No known indexable turning insert of the type defined in the introduction being able to be used for transverse turning has more than 3 cutting edges making these inserts less attractive from the cost point of view.

It is desirable to provide an indexable turning insert of the type defined in the introduction being improved in at least some aspect with respect to such turning inserts discussed above.

According to an aspect of the invention, such an indexable turning insert which is further wherein:

it comprises four the cutting parts, each cutting part has a clearance side extending on one of the sides of the insert from the cutting edge of the cutting part towards the centre part while making clearance angles in two dimensions with respect to the cutting edge, the cutting edge of each cutting part makes a working lead angle being below 90° by less than the clearance angles with the other of the sides of the insert, and every second of the cutting parts as seen in the direction of the outer perimeter of the insert have the clearance side on a same first side of the sides of the insert and the other two cutting parts have their clearance side on a second side of the sides of the insert for forming couples of mutually indexable cutting parts.

By combining the extension of each cutting edge with the clearance side and clearance angles of the cutting part in this way transverse turning may be carried out on a work piece having any dimensions in spite of the fact that the turning insert has four cutting edges making it more attractive from the cost point of view than known indexable turning inserts for such transverse turning. The turning insert according to the invention may also be designed to obtain a substantial depth when carrying out parting-off and grooving operations.

According to an embodiment of the invention the clearance angles of each cutting part are 2°-8°, 3°-6°, 3.5°-4.5° or substantially 4°. It has turned out that such clearance angles in two dimensions of the cutting parts of a turning insert according to the invention are suitable for combining with the angle made by the respective cutting edge for reliably obtain the behaviour of the insert aimed at while giving the cutting parts with cutting edges the longest possible life time.

According to another embodiment of the invention the angle made by the cutting edge of each cutting part with the other of the sides of the insert is below 90° by 1°-5°, 1.5°-3° or substantially 2°. These are suitable such angles for the extension of each cutting edge.

According to another embodiment of the invention the angle made by the cutting edge of each cutting part with the other of the sides of the insert is below 90° by a value of 40%-60% preferably substantially 50% of the clearance angles. This makes it possible to efficiently utilize the magnitude of the angles for the clearance side and the cutting edge for obtaining reliable operation of the insert over a long life time of each cutting edge.

According to another embodiment of the invention the insert has for each the large side the support centre part and the two cutting parts having the clearance side on the other large side extending in the same plane, and these planes for the two large sides extend in parallel with each other. This design of the insert with the cutting parts extending in the same plane as a support centre part on each large side of the insert on one hand facilitates the achievement of the proper operation of the insert when used for transverse turning, and on the other makes it possible to use the compression-moulding technique for manufacturing the insert, which is substantially less costly than injection moulding used for known turning inserts of corresponding type.

According to another embodiment of the invention the cutting parts are spaced apart for obtaining an indexing by rotating the insert substantially 180° about an axis being perpendicular to the opposing large sides. Thus, such indexing makes it possible to utilize two of the cutting edges, and the other two cutting edges may be used by turning the insert for mutually changing the direction of the two large sides thereof or moving the insert to another side of an insert holder of a cutting tool then changing possible transverse turning from left to right or conversely.

According to another embodiment of the invention the insert has one first lateral recess separating two adjacent cutting parts for forming lateral support surfaces of the insert facing away from a centre of the insert, and the insert has two the first lateral recesses, one between every second cutting part as seen in the direction of the outer perimeter. Such a recess may efficiently co-operate with a support wall having a complementary extension in a holder for the insert for firmly and by that reliably hold the insert in exact position during turning operation.

According to another embodiment of the invention the insert has at least one lateral support surface facing away from the centre of the insert between adjacent the cutting parts having no the first lateral recess therebetween, which then makes it possible to keep the insert properly in position in an insert holder by acting thereupon also in the direction towards this lateral support surface, such as by applying a pressure thereupon jamming the insert in place.

According to another embodiment of the invention the insert has an appearance with a butterfly-like character as seen in directions perpendicularly to the large sides, and each cutting edge may then form a wing tip of the butterfly. This type of appearance of the insert will make it easy to handle by reliably put it in proper positions and holding it in these positions.

According to another embodiment of the invention two adjacent of the cutting edges are pointing in substantially the same direction being substantially opposite to the direction in which the other two cutting edges point, which may also facilitate the handling of the insert.

According to another embodiment of the invention the extension of the clearance side of each cutting part from the cutting edge thereof towards the centre part is more than 5 mm, more than 6 mm or 7-12 mm. A turning insert with the features according to the invention may in spite of the existence of four cutting edges in this way be given parting-off depths of these values when carrying out parting-off or grooving.

The invention also relates, according to an aspect thereof, to a cutting tool comprising an indexable turning insert and an insert holder in which the insert holder is configured to hold the insert while keeping one the cutting edge to be presently used for cutting in parallel with an axis of rotation of a work piece to be machined. This means that the cutting tool may be used for transverse turning to the centre of a work piece in spite of the dimensions thereof and also for efficient parting-off and grooving.

According to an embodiment of the invention the insert holder comprises a body with a second recess having a bottom configured to form a support surface for one of the large sides of the insert, and this bottom is inclined with respect to outer surfaces of the body by an angle corresponding to the magnitude by which the angle of the cutting edge made with the other of the sides of the insert is below 90°. This makes it possible to firmly hold the insert in proper place and to use the insert, holder for such inserts having different thicknesses, i.e. different dimensions of their cutting edges.

According to another embodiment of the invention the insert holder comprises a body having a second recess for receiving the insert and a member configured to apply a pressure to the insert for keeping it in the second recess, and the member is then preferably configured to apply pressure on a lateral support surface of the insert for efficiently holding the insert by the holder.

According to another embodiment of the invention the tool comprises an insert, and the second recess in the body has a lateral support wall having an extension being complementary to the first lateral recess of the insert for supporting the insert received in the second recess of the holder.

According to another embodiment of the invention the second recess has a wall configured to form a support for lateral support surfaces of a the insert located opposite to the lateral support surfaces upon which the member is configured to apply a pressure, so that the insert may be efficiently jammed between the wall thereof and the member.

According to another embodiment of the invention the second recess is provided with a lateral aperture configured to accommodate the cutting edge of the insert located, oppositely to the one to be presently used for cutting, so that this cutting edge not used may be protected and not harmed when not in use.

According to another embodiment of the invention the insert holder is configured to hold a the insert received in a second recess thereof with only substantially the cutting part with the cutting edge to be presently used for cutting projecting with a clearance region thereof freely from the holder. Thus, the parts of the insert participating in supporting and holding the insert in the holder are completely independent of the cutting parts with cutting edge and clearance side thereof, so that the insert may be properly arranged in the holder for carrying out a turning operation with a cutting edge even if the cutting part of another cutting edge has been broken.

According to another embodiment of the invention the insert holder comprises a body provided with second recesses for receiving a the insert therein on opposite sides of the body and for holding the insert inclined in opposite directions by an angle being of a magnitude corresponding to how much the angle of the cutting edge made with the other of the sides of the insert is below 90° with respect to the respective side of two mutually parallel sides of the body. This means that the tool may be used for both left and right transverse turning without changing the position of the holder but only moving the insert from one second recess to the other.

The invention also relates to a use of an insert according to the invention for a tool according to the invention for parting-off and/or grooving and/or transverse, turning of a work piece as well as a method for manufacturing a turning insert according to the invention, which includes a step of compression-moulding material to the shape of the insert'.

Further advantages as well as advantageous features of the invention appear from the following description.

BRIEF DESCRIPTION OF THE DRAWINGS

With reference to the appended drawings, below follows a specific description of turning inserts as well as cutting tools according to embodiments of the invention.

In the drawings:

FIG. 1 is a view on a turning insert according to an embodiment of the invention, in which a cross-sectional view taken along I-I of a part thereof is shown separately, FIG. 2 is a side elevation view of the insert according to FIG. 1, FIG. 3 is a perspective view of the insert according to FIG. 1.

DETAILED DESCRIPTION

Figure 4:
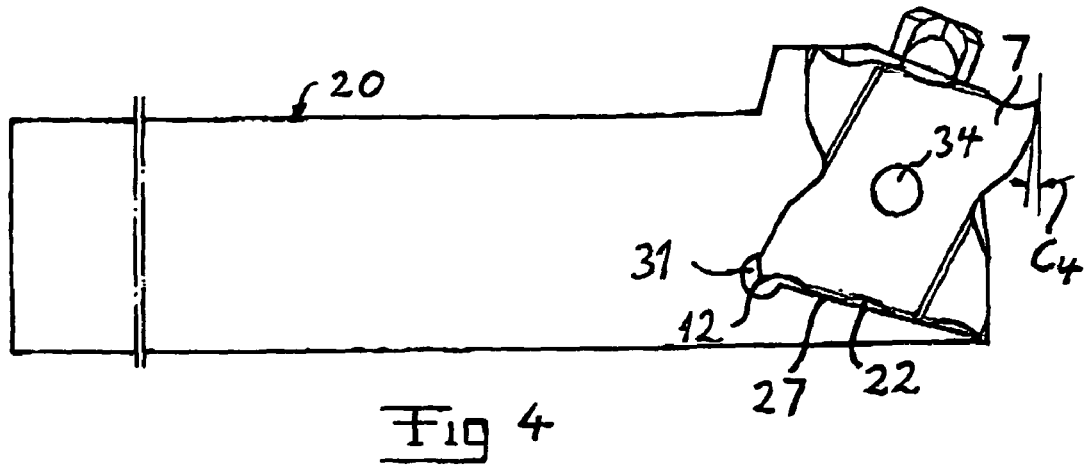
FIG. 4 is a side elevation view of a cutting tool with an insert according to FIG. 1 held in an insert holder.

FIG. 1 shows an indexable turning insert 1 according to an embodiment of the present invention, and the design thereof will now be described while simultaneously making reference to also FIGS. 2 and 3. This turning insert has two opposing large sides 2, 3 formed by a support centre part 4 and four cutting parts 5-8 projecting outwardly therefrom, each having a cutting edge 9-12 extending between the sides and being spaced apart around the outer perimeter of the centre part for indexing.

Each cutting part has a clearance side 13 (shown for the cutting part 6 in FIG. 3) extending on one of the sides of the insert from the cutting edge (10 for the cutting part 6) of the cutting part towards the centre part while making clearance angles in two dimensions with respect to the cutting edge. These clearance angles in two dimensions are illustrated by C1 in FIG. 1 and C2 in FIG. 2 and are in this embodiment both approximately 4°.

Every second 5, 6 of the cutting parts as seen in the direction of the outer perimeter of the insert have the clearance side on a same first side 2 of the sides of the insert and the other two cutting parts 7, 8 have their clearance side on a second side 3 of the sides of the insert for forming couples of mutually indexable cutting parts.

Furthermore, the cutting edge 9-12 of each cutting part makes a working lead angle with the other of the sides of the insert than the one with the clearing side for the cutting edge. The working lead angle is below 90° by less than the clearance angles. The angle is in this embodiment below 90° by approximately 2° corresponding to the angle C3 shown in FIG. 5. It is pointed out that the angles C1, C2 and C3 may be exaggerated in the Figures for better illustrating important features of the present invention. Lines intersecting diagonally opposed cutting edges 9-12 may form obtuse C5 and acute C6 angles, which means that each cutting edge has different distances to the two cutting edges adjacent thereto.

It is shown in the Figures that for each the large side the support centre part 4 and the two cutting parts having the clearance side on the other large side extend in the same plane, and that these planes for the two large sides extend in parallel with each other making it easy to manufacture an insert according to the present invention by a method including a step of compression-moulding (both traditional and multi-axial are conceivable) material to the shape of the insert.

For enabling accurate holding of the insert by an insert holder the insert has one first lateral recess 14, 15 separating two adjacent cutting parts for forming lateral support surfaces of the insert facing away from the centre of the insert. The insert has two the first lateral recesses, one between every second cutting part as seen in the direction of the outer perimeter. The insert also has two lateral support surfaces 16-19 facing away from the centre of the insert between adjacent the cutting parts having no the first lateral recess therebetween.

It also appears from especially FIG. 1 that the insert has an appearance with a butterfly-like character as seen in the directions perpendicular to the large sides 2, 3, in which each cutting edge 9-12 forms at wing tip of the butterfly, so that the distribution of the cutting edges does not follow any regular polygon. Typical dimensions for an insert shown in FIG. 1 is a distance of approximately 25 mm between adjacent edges and a clearance side depth D (see FIG. 1) of about 7 mm, which makes it possible to obtain parting-off of tubes having a wall thickness of up to approximately 7 mm.

The insert may be made of any material having mechanical properties required for the operation of such a turning insert. The cutting insert can be made from a hard, wear-resistant material, preferably cemented carbide, but may alternatively be of ceramics or cubic boron nitride (CBN). The most common hard material in cemented carbide is wolfram carbide. WC, and a binder metal. Alternative carbides may be of the metals titanium (TiC), tantalum (TaC) and niobium (NbC). The most common binder metal is cobalt (Co), but also nickel (Ni) is possible. The cemented carbide is a powder mixture built up by carbide particles having grain sizes of 0.5-10 µm and a binder metal. The percentage by volume of the binder metal is 5-40% and the percentage by volume of the carbides is 95-60%. The cutting insert may be coated with a layer of, e.g. Al2O3, TiN and/or TiCN. The cutting parts may include brazed on diamond plates.

A cutting tool according to the invention including an indexable turning insert according to FIGS. 1-3 will now be explained while making reference to FIGS. 4-8. The cutting tool comprises an insert holder 20 configured to hold the insert while keeping one the cutting edge 11 (in FIGS. 4 and 5) to be presently used for cutting in parallel with an axis of rotation of a work piece to be machined, which is obtained by inclining the insert in the insert holder by the angle C3 as shown in FIG. 5.

The insert comprises a body 21 with a second recess 22 having a bottom 23 configured to form a support surface for one of the large sides of the insert, and this bottom is inclined with respect to outer surfaces of the body 21 by an angle corresponding to C3.

The insert holder also has a member 24 configured to apply a pressure to the insert on a portion 25, 26 between the lateral support surfaces 16, 17 and 18. 19, respectively, for pressing the insert with the opposite support surfaces 18, 19 and 16, 17, respectively, towards a wall 27 of the second recess configured to form a support for these lateral support surfaces. The pressure of the members 24 is transferred to the insert 1 by an arm 28 and may preferably be increased and reduced by tightening and releasing, respectively, a threaded member 29, such as a bolt, connected to the arm 28.

The second recess in the body 20 also has a lateral support wall 30 having an extension being complementary to the first lateral recess 14, 15 of the insert for supporting the insert received in the second recess of the holder. This second recess is also provided with a lateral aperture 31 configured to accommodate the cutting edge of the insert located opposite to the one to be presently used for cutting.

Figure 5:
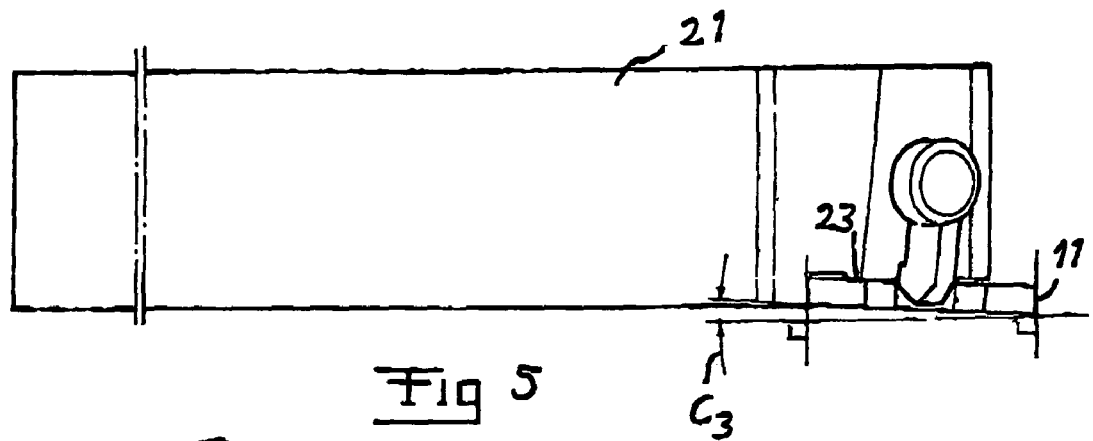
FIG. 5 is a view of the cutting tool according to FIG. 4 from above.

The insert holder is configured to hold a the insert received in a second recess thereof with only substantially the cutting part with the cutting edge to be presently used for cutting projecting with the clearance region thereof freely from the holder as shown in FIG. 4. The insert is then preferably held in a position resulting in a rake angle C4 of approximately 5°.

Figure 6:
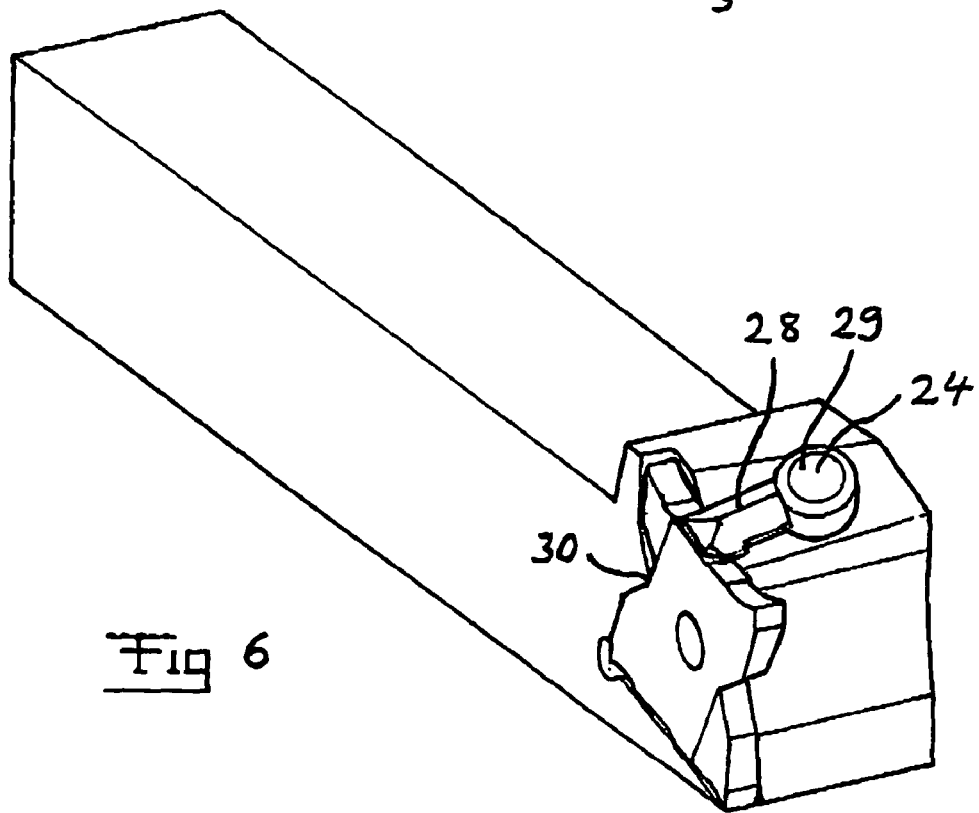
FIG. 6 is a perspective view of the cutting tool according to FIG. 4.
Figure 7:
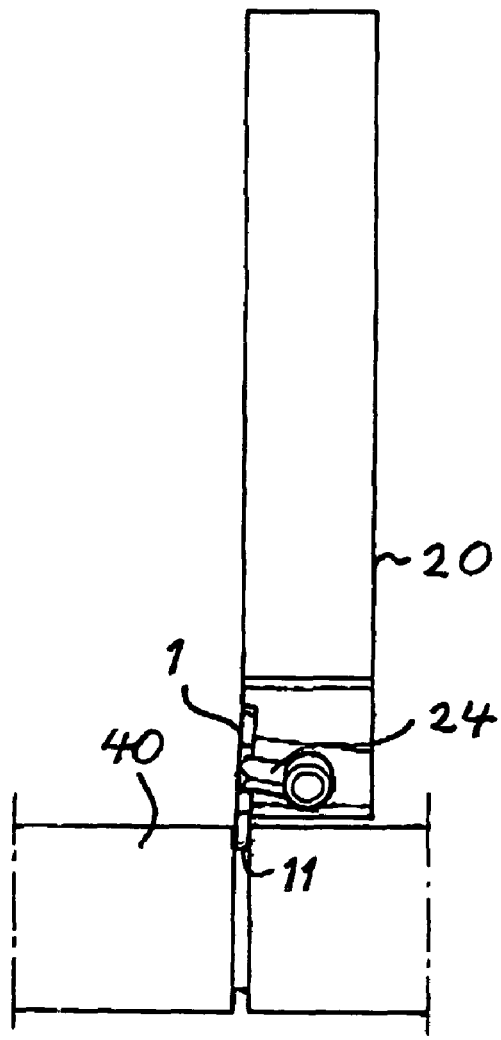
FIG. 7 is a simplified view illustrating a cutting tool according to FIG. 4 during grooving operation.
Figure 8:
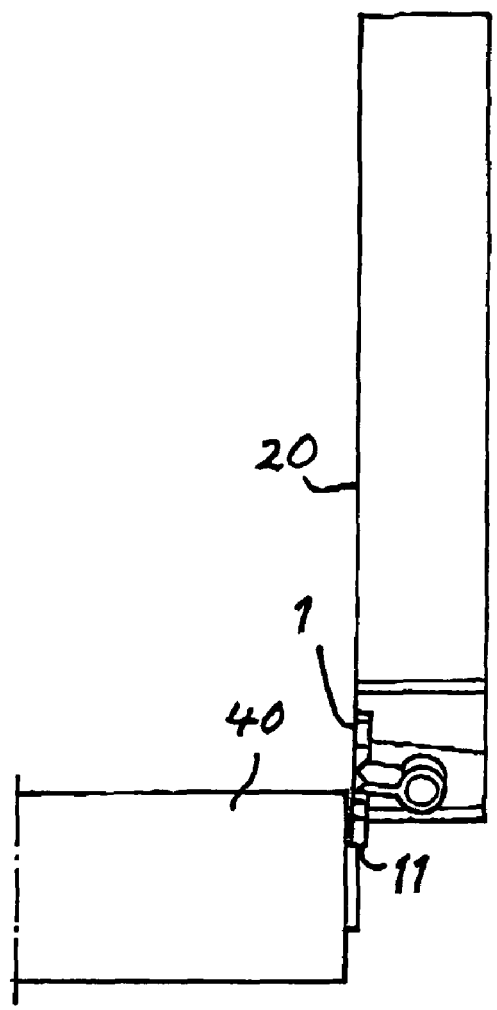
FIG. 8 is a view corresponding to FIG. 7 of the cutting tool according to FIG. 4 used for transverse turning.

A turning insert according to the invention and held in a cutting tool as shown in FIGS. 4-6 has the following advantageous features:

When the insert is held in the position according to FIG. 5 the angle C3 makes it possible to carry out transverse turning to the centre point of a work piece 40 of any dimension, as illustrated in FIG. 8. Thus, it will be possible to pass a flange on a work piece by the turning insert according to the invention, i.e. it will for example be possible to make a groove in the immediate connection to a diameter increase of an axle. The magnitude of the angle C3 with respect to the one of the clearance side angle C1 and C2 also makes it possible to carry out grooving and parting-off as illustrated in FIG. 7 to the depth D of the clearance side, since there will in spite of the angle C3 still be a clearance enabling this. Furthermore, if a cutting part is broken the insert may be firmly held in place while carrying out turning operation with any of the other cutting parts.

The insert is indexable by rotating it 180° about an axis being perpendicular to the opposing large sides 2, 3, and the insert may be turned for changing position of the two large sides for enabling use of the other two cutting edges. Thus, the mutually indexable cutting edges 11, 12 having the clearance sides on the same large side of the insert are inclined toward a normal to the same large side, whereas the other two cutting edges are inclined toward a normal to the other large side of the insert.

Figure 9:
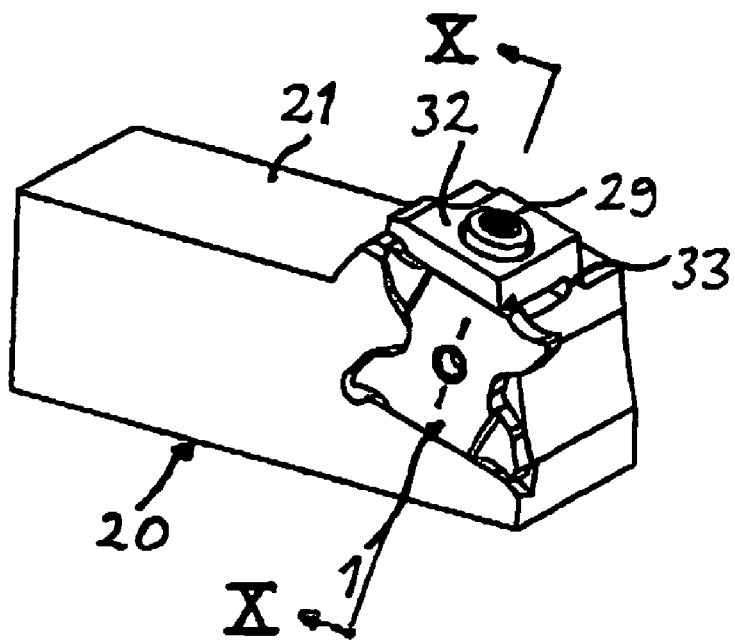
FIG. 9 is a perspective view of a cutting tool according to another embodiment of the invention.
Figure 10:
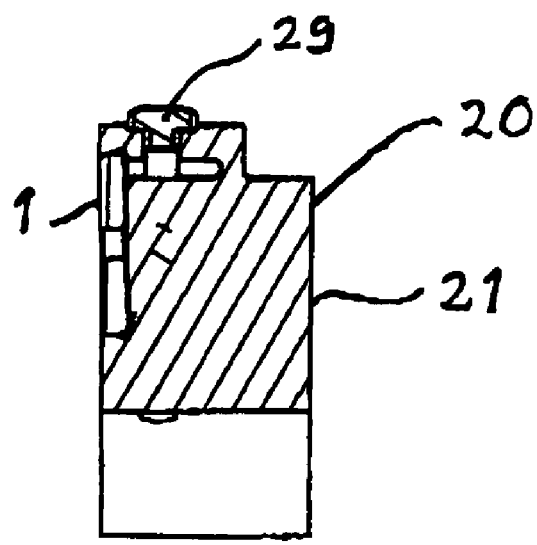
FIG. 10 is a cross-sectional view taken along X-X in FIG. 9.

FIGS. 9 and 10 show a differently designed insert holder in which the arm 28 of the member 24 is replaced by a portion 32 of the body being connected to the rest of the body through a narrow, integrated portion 33. The portion 33 is provided to enable tightening of the portion 32 by screwing a threaded member 29 for pressing the insert 1 into the recess 22 by acting upon the lateral support surfaces 16, 17.

It is shown in the Figures that the insert may have a central through-hole 34, which may be used for handling the insert and for other types of insert holders than the ones shown in the Figures for receiving a member for holding the insert in the insert holder.

The design of the insert and holder thereof according to the present invention also enables the use of the same holder for holding such inserts with cutting edges of different widths, so the holder does not have to be changed, but only the insert, for changing the width of a groove made by the tool.

The invention is of course not in any way restricted to the embodiments described above, but many possibilities to modifications thereof will be apparent to a person with ordinary skill in the art without departing from the scope of the invention as defined in the appended claims.

It would be possible to design the holder as a double side holder, i.e. provided with a the second recess for receiving an insert therein on opposite sides of the body and for holding the insert inclined in opposite directions, so that the tool may be used for both left and right transverse turning.

The disclosures in Swedish patent application No. 0702852-5, from which this application claims priority, are incorporated herein by reference.

The invention claimed is:

1. An indexable turning insert comprising two opposing large sides (2, 3) formed by a support centre part (4) and a plurality of cutting parts (5-8) projecting outwardly therefrom, each having a cutting edge (9-12) extending between said sides and being spaced apart around the outer perimeter of said centre part for indexing, characterized in that
it comprises four said cutting parts,
each cutting part has a clearance side (13) extending on one of said sides of the insert from the cutting edge of the cutting part towards said centre part (4) while making clearance angles ($C_1$, $C_2$) in two dimensions with respect to the cutting edge,
said cutting edge of each cutting part makes a working lead angle being below 90° by less ($C_3$) than said clearance angles with the other of said sides of the insert, and
every second of said cutting parts as seen in the direction of said outer perimeter of the insert have said clearance side on a same first side of said sides of the insert and the other two cutting parts have their clearance side on a second side of said sides of the insert for forming couples of mutually indexable cutting parts.

2. An insert according to claim 1, characterized in that said clearance angles ($C_1$, $C_2$) of each cutting part are 2°-8°, 3°-6°, 3.5°-4.5° or substantially 4°.

3. An insert according to claim 1 or 2, characterized in that said working lead angle (90°-$C_3$) made by said cutting edge of each cutting part with said other of said sides of the insert is below 90° by 1°-5°, 1.5°-3° or substantially 2°.

4. An insert according to any of the preceding claims, characterized in that said working lead angle (90°-$C_3$) made by said cutting edge of each cutting part with said other of said sides of the insert is below 90° by a value of 40%-60%, preferably substantially 50% of said clearance angles ($C_1$, $C_2$).

5. An insert according to any of the preceding claims, characterized in that for each said large side (2, 3) said support centre part (4) and the two cutting parts (5, 6 and 7, 8) having the clearance side on the other large side extend in the same plane, and that these planes for the two large sides extend in parallel with each other.

6. An insert according to any of the preceding claims, characterized in that said cutting parts (5-8) are spaced apart for obtaining an indexing by rotating the insert substantially 180° about an axis being perpendicular to said opposing large sides (2, 3).

7. An insert according to any of the preceding claims, characterized in that it has one first lateral recess (14, 15) separating two adjacent cutting parts for forming lateral support surfaces of the insert facing away from a centre of the insert, and that the insert has two said first lateral recesses, one between every second cutting part as seen in the direction of said outer perimeter.

8. An insert according to claim 7, characterized in that it has at least one lateral support surface (16-19) facing away from the centre of the insert between adjacent said cutting parts having no said first lateral recess (14, 15) therebetween.

9. An insert according to any of the preceding claims, characterized in that it has an appearance with a butterfly-like character as seen in directions perpendicularly to said large sides (2, 3).

10. An insert according to claim 9, characterized in that each cutting edge (9-12) forms a wing tip of said butterfly.

11. An insert according to any of the preceding claims, characterized in that two adjacent (9, 11) of said cutting edges are pointing in substantially the same direction being substantially opposite to the direction in which the other (10, 12) two cutting edges point.

12. An insert according to any of the preceding claims, characterized in that the extension of said clearing side (13) of each cutting part from said cutting edge thereof towards said centre part (4) is more than 5 mm, more than 6 mm or 7-12 mm.

13. A cutting tool comprising an indexable turning insert and an insert holder, characterized in that said insert is an insert (1) according to any of claims 1-12, and that said insert holder (20) is configured to hold the insert while keeping one said cutting edge (11) to be presently used for cutting in parallel with an axis of rotation of a work piece (40) to be machined.

14. A tool according to claim 13, characterized in that said insert holder (20) comprises a body (21) with a second recess (22) having a bottom (23) configured to form a support surface for one of said large sides (2, 3) of said insert, and that this bottom is inclined with respect to outer surfaces of said body by an angle ($C_3$) corresponding to the magnitude by which said angle of said cutting edge made with said other of said sides of the insert is below 90°.

15. A tool according to claim 13 or 14, characterized in that said insert holder (20) comprises a body (21) having a second recess (22) for receiving said insert (1) and a member (24) configured to apply a pressure to said insert for keeping it in said second recess.

16. A tool according to claim 15, characterized in that said member (24) is configured to apply a pressure on a lateral support surface (25) of said insert.

17. A tool according to claim 14 or 15, characterized in that it comprises an insert according to claim 7, and that said second recess (22) in said body has a lateral support wall (30) having an extension being complementary to said first lateral recess (14, 15) of the insert for supporting said insert received in said second recess of the holder.

18. A tool according to claim 15 or 16, characterized in that said second recess (22) has a wall (27) configured to form a support for lateral support surfaces (16-19) of a said insert located opposite to said lateral support surface (25, 26) upon which said member (24) is configured to apply a pressure.

19. A tool according to claim 14 or 15, characterized in that said second (22) recess is provided with a lateral aperture (31) configured to accommodate the cutting edge (12) of the insert located oppositely to the one (11) to be presently used for cutting.

20. A tool according to any of claims 13-19, characterized in that said insert holder (20) is configured to hold a said insert received in a second recess (22) thereof with only substantially the cutting part (7) with the cutting edge to be presently used for cutting projecting with the clearance region thereof freely from the holder.

21. A tool according to any of claims 13-20, characterized in that said insert holder (20) comprises a body (21) provided with second recesses (22) for receiving a said insert therein on opposite sides of the body and for holding the insert inclined in opposite directions by an angle being of a magnitude corresponding to how much said angle of the cutting edge made with said other of said sides of the insert is below 90° with respect to the respective side of two mutually parallel sides of said body.

22. Use of an insert according to any of claims 1-12 or a tool according to any of claims 13-21 for parting off and/or grooving and/or transverse turning of a work piece.

23. A method for manufacturing a turning insert according to any of claims 1-12, characterized in that it includes a step of compression-moulding material to the shape of said insert.

* * * * *